June 4, 1940.   B. DICK   2,202,841

BRAKING MECHANISM

Filed Jan. 5, 1939

INVENTOR
BURNS DICK
BY
ATTORNEY

Patented June 4, 1940

2,202,841

UNITED STATES PATENT OFFICE 2,202,841

BRAKING MECHANISM

Burns Dick, Ferguson, Mo., assignor to Wagner Electric Corporation, St. Louis, Mo., a corporation of Delaware Application January 5, 1939, Serial No. 249,355

8 Claims. (Cl. 188—79.5)

My invention relates to brakes and more particularly to improvements in the type of brake in which two shoes are pivotally connected together.

One of the objects of my invention is to provide an improved means for pivotally connecting two shoes together and so anchoring the pivoted ends to a support that the "forward" shoe will be able to apply an outward force to the connected end of the "rear" shoe and to so associate with said means a friction device functioning to automatically maintain the pivotal axis of the shoe ends in a proper adjusted position with respect to the drum.

Figure 1:
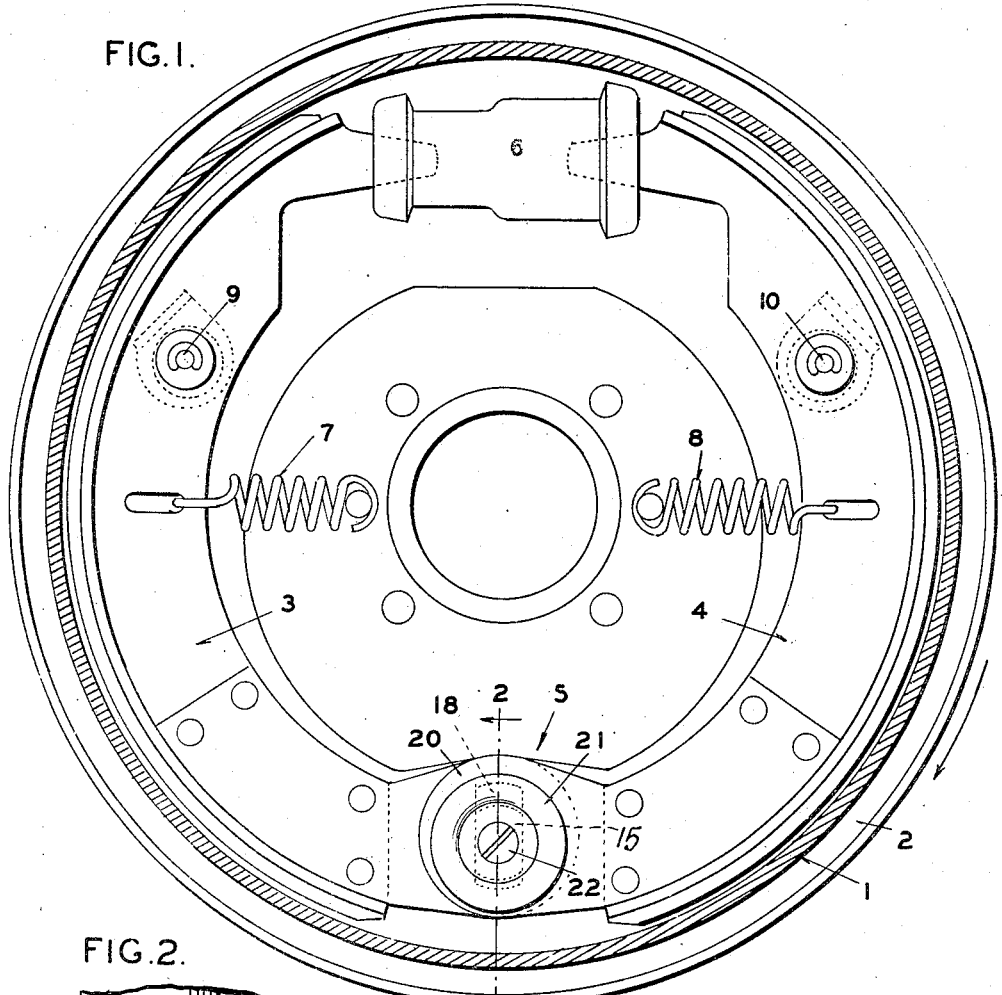
Figure 2:
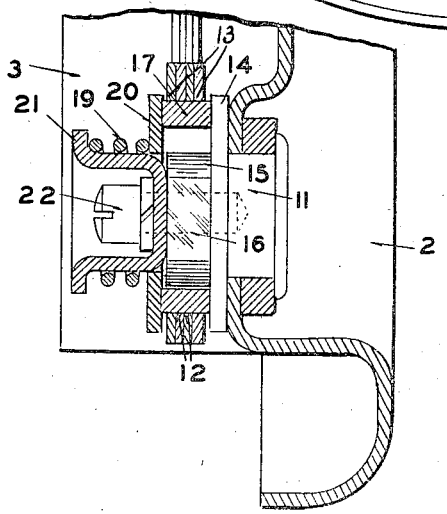

Other objects of my invention will become apparent from the following description taken in connection with the accompanying drawing in which Figure 1 is a side view of a brake assembly embodying my invention and Figure 2 is a cross-sectional view taken on the line 2—2 of Figure 1.

Referring to the drawing in detail, numeral 1 indicates the usual brake drum secured to a rotating member such as a vehicle wheel and 2, the support or backing plate secured to a fixed member. Within the drum are two shoes 3 and 4 having their lower ends pivotally mounted on the backing plate by my improved mounting means generally indicated by the numeral 5. The upper adjacent ends of the shoes are shown as being actuatable into engagement with the drum by the fluid motor 6 connected to a suitable source of pressure (not shown). Springs 7 and 8 normally hold shoes 3 and 4 disengaged from the drum and against the "off" position stops 9 and 10.

The mounting means for so connecting shoes 3 and 4 together that improved braking action results is generally indicated at 5. A pin 11 is secured to the backing plate 2 and extends through an opening 12 in the lower end of shoe 3 and an opening 13 in the lower bifurcated end of shoe 4 which receives the end of shoe 3. The pin 11 has an annular shoulder 14 for engagement with the backing plate and also a portion 15 having opposed flat surfaces 16 lying in planes parallel to a radial line passing through the center of the pin. A bearing member 17 formed with a slot 18 is mounted on portion 15 and serves as the pivot bearing for the ends of shoes 3 and 4 which are positioned thereon by the openings 12 and 13. The sides of slot 18 cooperate with the flat surfaces 16 and the length of the slot is greater than the length of portion 15 in order that the bearing member and the shoes can move in a radial direction. The bearing member 17 is also of a thickness greater than the combined thickness of the ends of the two shoes. The bearing member is frictionally held against the annular shoulder 14 by means of a spring 19 interposed between a washer 20 engaging the bearing member and a member 21 secured to the inner end of pin 11 by a screw 22. The pressure exerted by the spring is such as to maintain the bearing member in any position it may assume but not of sufficient pressure to prevent the member and the shoe ends to be moved toward the drum during braking action and as a result of a force produced by the frictional drag on a brake shoe.

In operation, when the drum is rotating in its normal forward direction, as indicated by the arrow, and it is desired to apply the brake, the fluid motor is actuated, thereby causing the shoes to move into engagement with the drum by a rotation around pin 11. Being independent of the friction means, the shoes are freely rotatable on the bearing member 17.

When the shoes are engaged with the drum, the braking torque will be taken by pin 11. The drag of the drum on the forward shoe 4 will produce a force causing the pivoted end of the shoe to be moved into tight engagement with the drum. This outward radial movement of the shoe is permitted by the shoe mounting means as the bearing member is only frictionally held in position and slot 18 is of sufficient length to permit the movement. Since the bearing member pivotally connects both shoes together, any movement of the end of shoe 4 toward the drum will also cause a corresponding movement of the end of the shoe 3.

It is thus seen that by the means employed for pivotally connecting the shoe ends together and also so anchoring said shoes that they can move together toward the drum, it is possible to cause an outwardly acting force to be effective on the pivoted ends of both shoes, said force being produced by shoe 4 during braking action. This transferred force acting on the heel end of shoe 3 causes said shoe to have a considerably increased braking effect, thus increasing the entire torque output of the brake. Also by transferring part of the radial force acting on the end of shoe 4 to the end of shoe 3, the tendency of the end of the former to wedge into the drum is diminished, thus resulting in a brake which can be better controlled by the operator to produce a smooth braking action. Since both shoe ends at the pivot move outwardly together, there will be uniform lining wear at the end which is not possible when the shoes are pivoted on separate pins.

When the shoes are released from the drum, the bearing member 17 will maintain its position due to the frictional grip caused by spring 19. The shoes are retracted from the drum by a pivotal movement on the bearing member under the action of springs 7 and 8.

As the linings on the brake shoes wear, the pivoted ends of the shoes will be automatically adjusted toward the drum under the action of the force tending to move the end of shoe 4 toward the drum when this shoe is applied to the drum. The adjustment will always be maintained by the frictional grip on the bearing member caused by spring 19. Since the friction means does not contact with the brake shoes, the frequent pivotal movement of the shoes in service does not result in any wear of a friction surface and consequently the adjusted degree of frictional resistance to movement of the bearing member will remain substantially constant.

When the drum is rotating in the direction opposite that indicated by the arrow, shoe 3 will become the "forward" shoe and produce the force acting to move both pivoted ends of the shoes toward the drum. Otherwise the operation of the brake is the same as already described.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking mechanism, a support, two shoes positioned in end-to-end relation for cooperation with the drum, means for pivotally connecting adjacent ends of the shoes together to rotate about the same axis, means for so mounting said connecting means on the support as to anchor said shoes against circumferential movement but permit the ends of said shoes and their pivotal axis to be moved as a unit toward the drum during braking action and in accordance with wear of the shoes, and frictional means for preventing at all times the pivotal axis of the connection from moving away from the drum.

2. In braking mechanism embodying a brake drum and two brake shoes, a mounting for said shoes comprising means for pivotally connecting the ends of the shoes together to rotate about the same axis, means constituting an abutment for preventing said shoes from having circumferential movement but permitting the ends of said shoes and their pivotal axis to move together toward the drum by a force effective during brake application when the brake lining thickness at the pivoted ends of the shoes is reduced by wear, and friction means functioning to hold the pivotal axis of the shoes in the position it assumes during braking action.

3. In braking mechanism embodying a brake drum and two brake shoes, anchor means for the brake shoes comprising an element for pivotally connecting the ends of the shoes together to rotate about the same axis, and means at the connected ends of the shoes for preventing circumferential movement, said element being movable toward the drum by force effective during brake application when the brake lining thickness at the pivoted ends of the shoes is reduced by wear, and friction means functioning to oppose movement of the element away from the drum.

4. In braking mechanism, a support, a brake drum, two brake shoes, means comprising a bearing member for pivotally connecting the brake shoes together, means for mounting said bearing member on the support and comprising a slot for permitting movement of the bearing member toward the drum, and friction means functioning to oppose movement of the bearing member and the shoe ends away from the drum but permitting their movement toward the drum by a force effective during braking action.

5. In braking mechanism, a support, a brake drum, two brake shoes, means comprising a bearing member for pivotally connecting the brake shoes together to rotate about the same axis, means for mounting the bearing member on the support for movement toward the drum, said means preventing circumferential movement of the shoes, and means associated with the bearing member for establishing a frictional resistance to its movement away from the drum but permitting movement toward the drum by a force effective during braking action and in accordance with wear of the shoes.

6. In braking mechanism, a support, a brake drum, two brake shoes, a bearing member for pivotally connecting the ends of the brake shoes together, a pin for mounting the bearing member on the support, means for permitting the bearing member to move relatively to the pin and toward the drum during braking action and as a result of wear of the friction surfaces of the shoes at their pivoted ends, and means for establishing a frictional resistance against movement of the bearing member away from the drum.

7. In braking mechanism, a support, a brake drum, two brake shoes, a bearing member for pivotally connecting the ends of the brake shoes together, a pin for mounting the bearing member on the support, means for permitting the bearing member to move relatively to the pin and toward the drum during braking action and as a result of wear of the friction surfaces of the shoes at their pivoted ends, and means comprising a spring carried by the pin for frictionally clamping the bearing member in an adjusted position on the pin.

8. In braking mechanism, a support, a brake drum, two brake shoes, a bearing member for pivotally connecting the ends of the brake shoes together, said bearing member being provided with a slot, a pin fixed to the support and extending through the slot, said pin and slot having such a relation that the bearing member is prevented from circumferential movement but is free to move towards the drum during braking action and as a result of wear of the friction surfaces of the shoes at their pivoted ends, and means for frictionally clamping the bearing member in an adjusted position on the pin, said means comprising members on said pin having surfaces cooperating with the surfaces on the bearing member and a spring carried by the pin for causing the cooperating surfaces to be forced together.

BURNS DICK.